(12) United States Patent
Södö

(10) Patent No.: US 7,847,663 B2
(45) Date of Patent: Dec. 7, 2010

(54) FILTERING CHOKE ARRANGEMENT

(75) Inventor: Nicklas Södö, Vaasa (FI)

(73) Assignee: Vacon Oy J, Vaasa (FI)

( * ) Notice: Subject to any disclaimer, the term of this patent is extended or adjusted under 35 U.S.C. 154(b) by 22 days.

(21) Appl. No.: 12/216,452

(22) Filed: Jul. 3, 2008

(65) Prior Publication Data

US 2009/0009277 A1   Jan. 8, 2009

(30) Foreign Application Priority Data

Jul. 6, 2007   (FI) .................................. 20075524

(51) Int. Cl.
   *H01F 21/00* (2006.01)
(52) U.S. Cl. ...................................... 336/110
(58) Field of Classification Search ................... 336/65, 336/83, 110, 178, 212, 233–234
   See application file for complete search history.

(56) References Cited

U.S. PATENT DOCUMENTS

| 5,821,844 | A  | * | 10/1998 | Tominaga et al. | ........... | 336/110 |
| 6,734,771 | B2 | * | 5/2004  | Okita et al.    | ................. | 335/229 |
| 6,737,951 | B1 | * | 5/2004  | Decristofaro et al. | ....... | 336/234 |
| 6,791,446 | B2 | * | 9/2004  | Sato et al.     | ................... | 336/110 |
| 7,190,249 | B2 | * | 3/2007  | Maekawa et al.  | ............. | 336/92 |

FOREIGN PATENT DOCUMENTS

| EP | 1 187 150 A1 | 3/2002 |
| EP | 1 263 005 A1 | 4/2002 |
| FR | 2 464 543    | 6/1981 |
| JP | 57-965512    | 6/1982 |
| JP | 2003068535 A | 7/2003 |
| JP | 2007123596 A | 5/2007 |

\* cited by examiner

*Primary Examiner*—Tuyen Nguyen
(74) *Attorney, Agent, or Firm*—Birch, Stewart, Kolasch & Birch, LLP

(57) ABSTRACT

DC choke arrangement of a power transformer, especially of a frequency converter, provided with a DC circuit and connected to an AC electricity network, to limit the harmonics of the network current taken by an appliance from the AC network, in which DC choke arrangement is at least one choke (Ldc+, Ldc−), which is arranged in the magnetic core, which contains pillar parts and yoke parts (1$a'$, 1$b'$, 2$a'$, 2$b'$), in which one or more permanent magnets (51) are arranged in the magnetic core of the choke, and in which the permanent magnet is positioned at an angle with respect to the longitudinal direction of the part or parts of the magnetic core such that the cross-sectional area of the permanent magnet is greater than the cross-sectional area of the part of the magnetic core in question or the parts of the magnetic core in question.

15 Claims, 3 Drawing Sheets

FILTERING CHOKE ARRANGEMENT

FIELD OF TECHNOLOGY

Figure 1:
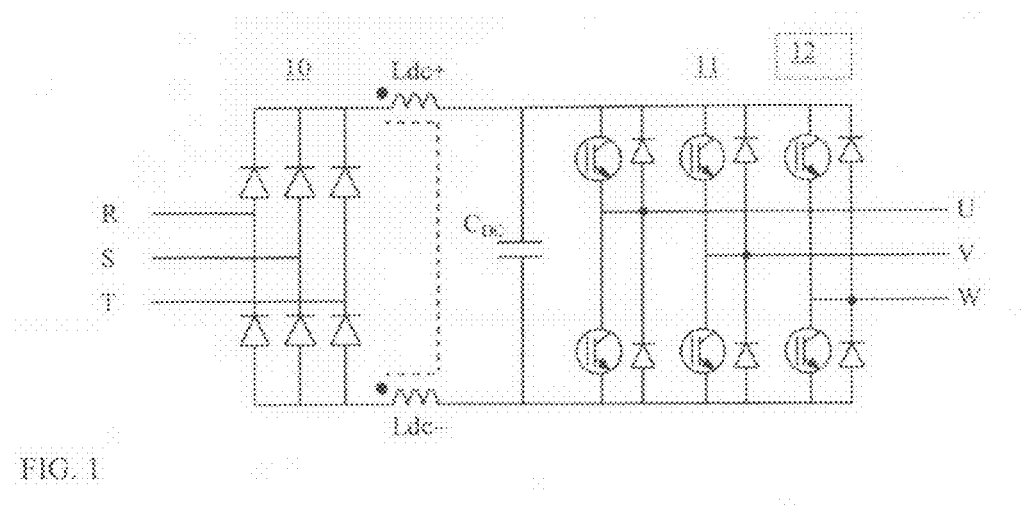

The object of this invention is a filtering choke arrangement of a DC intermediate circuit used in power transformers, especially frequency converters, provided with a DC intermediate circuit, which filtering choke arrangement is used to limit the harmonics of the network current taken by an appliance.

PRIOR ART

The amount of current harmonics produced in the supply network of power electronics devices, such as frequency converters, must be limited owing to distortion. Numerous international official regulations and standards, such as e.g. IEC61300-3-12, relate to the matter.

In solutions of the PWM frequency converter type, in which the supply voltage is rectified and filtered into the DC voltage of the intermediate circuit, it is general to use a DC choke disposed between the rectifier bridge and the DC filter capacitor to limit the harmonics of the network current. The choke can be disposed in accordance with the embodiment of FIG. 1 either on the + or on the − busbar of the DC circuit or on both.

The limitation requirements for the harmonics of the current generally result in the inductance value of the choke having to be very big. Since it must simultaneously withstand the stresses of the full network current, the dimensioning generally results in a very large and heavy component. In order to limit the size of the choke, it is advantageous to use a core material that has great flux density tolerance, such as e.g. a stack assembled from transformer plates.

In a DC choke application, in which the current flows in only one direction, the core of the choke magnetizes in only one direction. It is prior art to use a permanent magnet as a part of the core structure in order to utilize the other half of the magnetizing area, and via that to put into use the full capacity of the core, e.g. according to patent publication U.S. Pat. No. 6,753,751.

To minimize the size of the choke core the magnetic flux created by the permanent magnet is the opposite with respect to the magnet flux formed by the external current; the purpose of the dimensioning can be e.g. that the density of the magnetic flux with 0-current is a negative 70% of the saturation limit and with full current the same magnitude but positive.

Owing to the opposite flux caused by the external current, a demagnetization risk is attached to DC choke solutions utilizing a permanent magnet. The flux density, with which the permanent magnet demagnetizes, depends on the material used and the temperature, typically being 1.0 ... 1.4 T (tesla). In chokes the saturation flux density of the transformer plate generally used is in the range of 1.4 ... 1.6 T. That being the case, if the current of the choke substantially exceeds the dimensioned level, the external flux can exceed the demagnetizing limit of the permanent magnet, in which case it loses its original magnetic properties and can even magnetize in the wrong direction. This kind of situation is possible with unpredictable large overcurrents, such as those which can occur in frequency converters e.g. in conjunction with a mains outage if the voltage of the DC capacitor of the intermediate circuit has dropped very low when the mains voltage returns. After this kind of situation the DC choke has permanently lost some of its network current filtering properties.

SUMMARY OF THE INVENTION

The object of this invention is a DC filter choke solution, used in the DC circuit of power transformers and provided with a permanent magnet, in which solution there is no danger of demagnetization of the permanent magnet.

In the solution according to the invention the cross-sectional areas of the pillar parts and of the yoke parts of the magnetic core are preferably of different magnitudes and the permanent magnet is disposed either in one or in several corners of the core structure transversely at an angle. The layout makes it possible according to the invention for the cross-sectional area of the permanent magnet to be appreciably larger than the cross-sectional area of the pillar of the thinnest section of the core structure.

Since the same flux penetrates both the core structure and the permanent magnet, the flux density in the permanent magnet remains lower than in the core of the choke. The choke according to the invention is dimensioned such that when the thinnest section of the core structure saturates, the flux density at the point of the permanent magnet remains below its demagnetization limit. Since the flux density of the core does not significantly change after the saturation limit even if the current of the choke were to grow, the demagnetization limit of the permanent magnet is thus not exceeded in any practical conditions.

SHORT DESCRIPTION OF THE DRAWINGS

Figure 2:
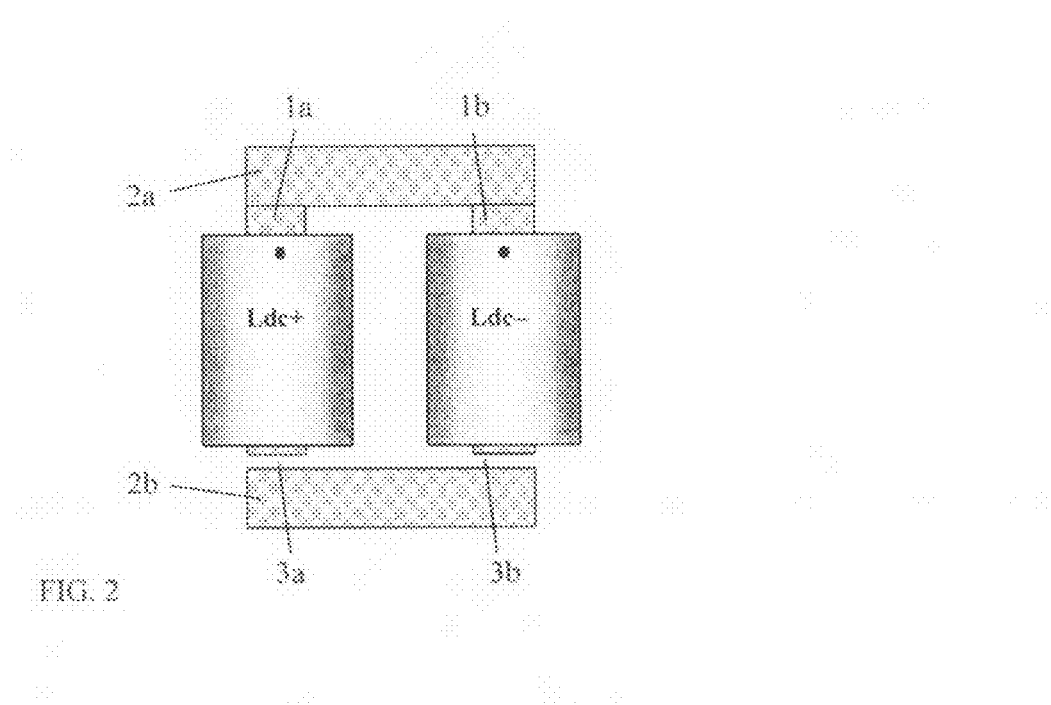
Figure 3:
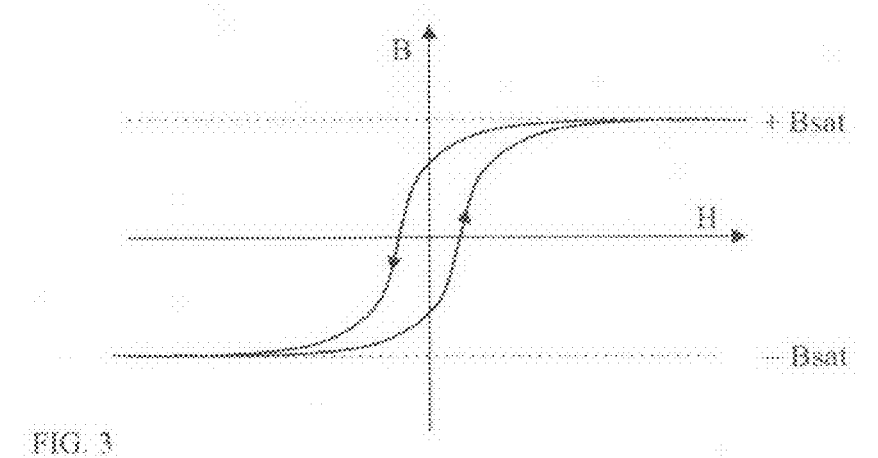
Figure 4:
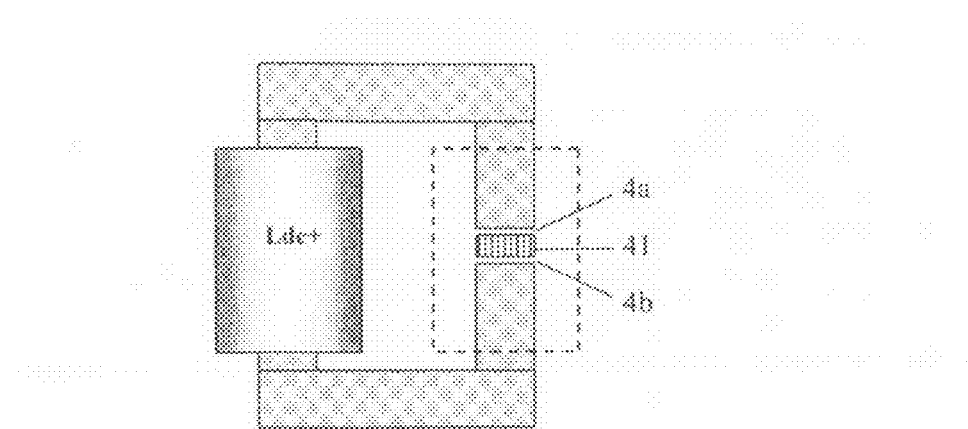
Figure 5:
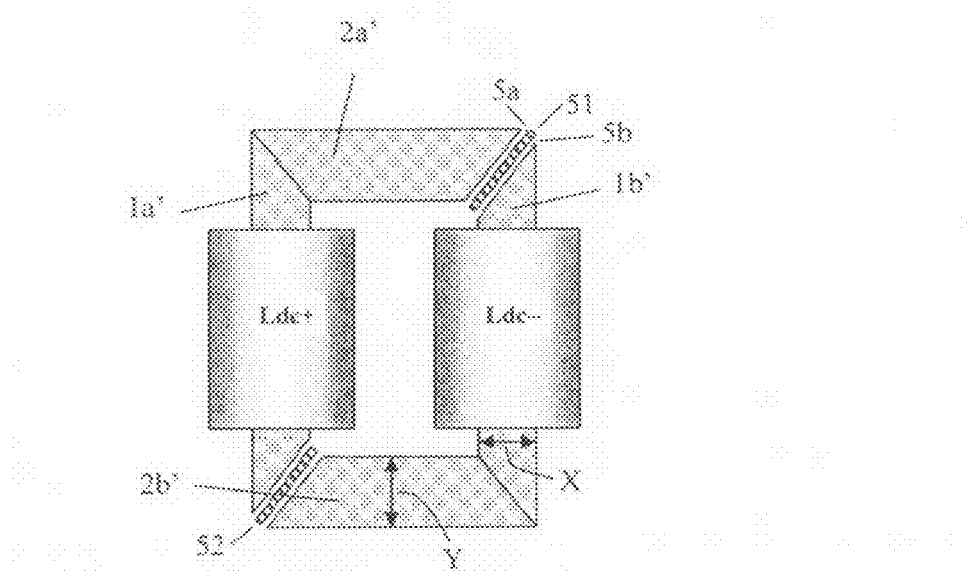
Figure 6:
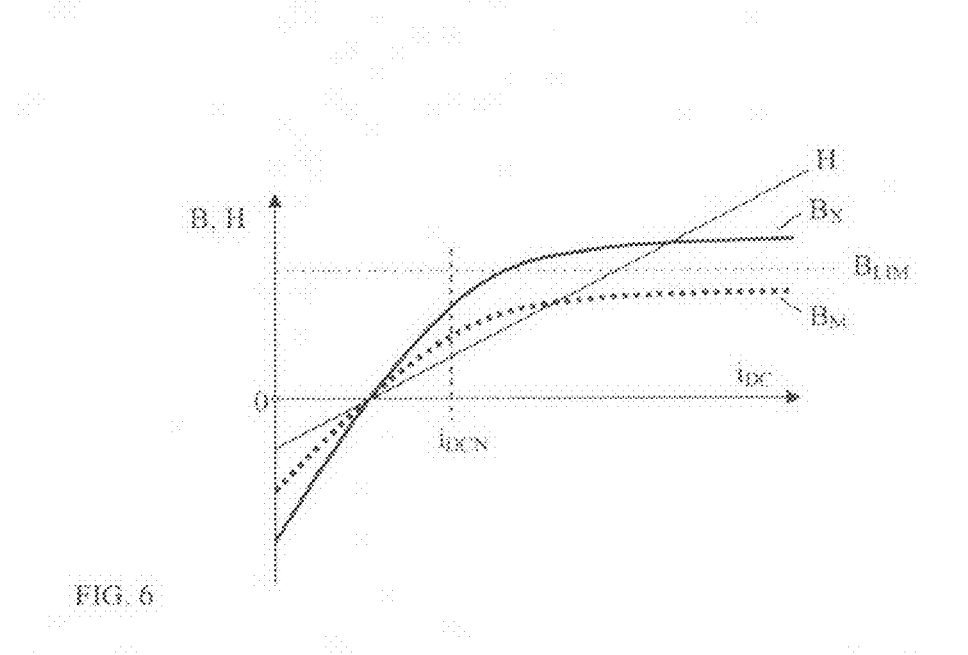
Figure 7:
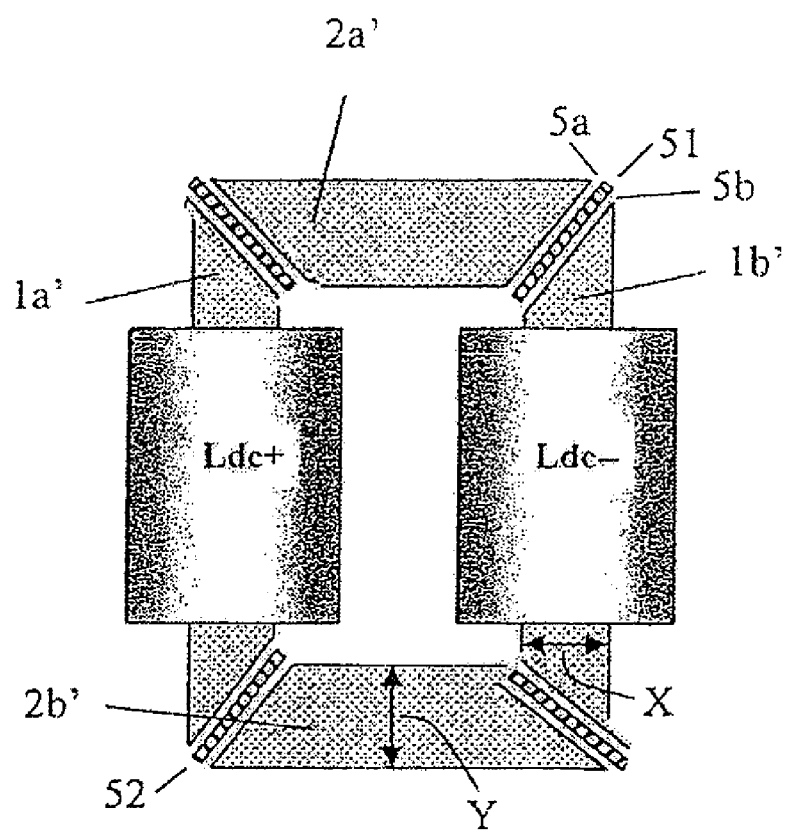

In the following, the invention will be described in more detail by the aid some embodiments with reference to the attached drawings, wherein FIG. 1 presents the main circuit of a frequency converter, FIG. 2 presents a conventional two-pillar DC choke solution, FIG. 3 presents a magnetization curve of the core material of the choke, FIG. 4 presents a prior-art solution for disposing a permanent magnet in the core of the choke, FIG. 5 presents a solution according to the invention for disposing a permanent magnet in the core of the choke, FIG. 6 presents the magnetization of parts of the choke with the solution according to the invention; and FIG. 7 illustrates an embodiment of the invention wherein four units of permanent magnets are disposed in all the corners of the magnetic core.

PRIOR ART AND DETAILED DESCRIPTION OF THE INVENTION

FIG. 1 presents the main circuit of a normal PWM frequency converter, in which is a network bridge 10 comprised of diodes for rectifying the three-phase alternating voltage of the supply network into the DC voltage of the DC intermediate circuit, a filtering capacitor $C_{DC}$, a load bridge 11 comprised of three phase switches implemented with power semiconductors, which forms the three-phase output voltage U, V, W from the DC voltage of the intermediate circuit, and a control unit 12. The figure also presents the two-part DC choke solution Ldc+, Ldc− generally used to filter the harmonics of the network current. The winding direction of the windings of the choke is marked with small dots next to the choke. A general DC choke solution is also one in which only a single branch-specific choke (either Ldc+ or Ldc−) is used.

FIG. 2 presents an example of the construction of a typical conventional choke. The magnetic core of the choke comprises two pillars 1a, 1b and yokes 2a, 2b connecting the pillars. The magnetic circuit also normally comprises an air gap 3a, 3b, with which the desired inductance value, and the current limit at which the magnetic core starts to saturate, is set. The windings Ldc+ and Ldc−, or only one winding, e.g. Ldc+, are wound in the same direction around the pillars. With both the single-branch (Ldc+ or Ldc−) and the double-branch (Ldc+ and Ldc−) solution, it is known that the same filtering effect of the harmonics of the network current is achieved. The double-branch solution is indeed used mainly to limit current in a line-to-earth short-circuit situation of the motor circuit, because in this kind of situation the current typically flows only via one of the branches.

FIG. 3 presents a prior-art characteristic magnetization curve of the magnetic core material. The dimension H depicts the strength of the magnetic field, which is directly comparable to the current of the winding wound around the core, and the dimension B depicts the density of the magnetic flux in the core material. The limit values Bsat+ and Bsat− depict the saturation limits of the flux density, significantly greater than which the density of the magnetic flux does not grow irrespective of the strength of the magnetic field.

In a DC choke solution the magnetic circuit is generally dimensioned such that saturation still does not significantly reduce the inductance value of the choke at the nominal current. The saturation limit is not, e.g. with the transformer plate generally used as the core material of a choke, very abrupt, so it is normal to use approx. 70% of the saturation limit of the flux density as the dimensioning criterion of the nominal current, which is approx. 1.4 . . . 1.6 T.

FIG. 4 presents a prior-art method for disposing a permanent magnet in the core of the choke. In it the pillar situated inside the winding is divided into two parts, between which a permanent magnet 41 is disposed. In one half or preferably in both halves of the magnet are air gaps 4a, 4b, which are important not only as a part of the magnetic circuit but also as a mechanical protector of the permanent magnet, the material of which is often very hard and brittle.

In this prior-art layout the flux density penetrating the permanent magnet is roughly the same as the flux density in the pillar on both sides of it. That being the case, when the saturation limit of the flux density in the pillar material is higher than the demagnetization limit of the permanent magnet, it is possible that in special situations the permanent magnet demagnetizes. After even one such situation, the magnetic properties of the magnet are permanently changed, which is very detrimental from the viewpoint of the original intended application of the choke.

FIG. 5 presents a new method according to the invention for disposing a permanent magnet in the core of the choke. The magnet 51 according to the invention is positioned transversely at an angle (in the figure, at an angle of 45° with respect to the yoke and correspondingly to the longitudinal axis of the pillar) in the corner of the choke core such that it fills the entire aperture in the core material. There can be many magnets (51, 52), each in its own corner. Air gaps 5a, 5b can be arranged on both sides of the permanent magnet. In addition it is also preferable that the cross-sectional areas of the pillar parts and the yoke parts 1a', 1b', 2a' and 2b' of the core are of different magnitudes preferably such that the cross-sectional area (X) of the pillar is smaller than that of the yoke (Y). Owing to its angular positioning, the surface area $A_M$ of the permanent magnet is greater than the cross-sectional area $A_X$ of the part of the thinner core material. With the markings according to the figure, the ratio of the surface areas is:

$$A_M/A_X = \sqrt{X^2+Y^2}/X \quad [1]$$

FIG. 7 presents a new method according to the invention for disposing a permanent magnet in the core of the choke. The magnets 51, 52 are positioned transversely at an angle (in the figure, at an angle of 45° with respect to the yoke and correspondingly to the longitudinal axis of the pillar) in all of the corners of the choke core such that it fills the entire aperture in the core material. Air gaps 5a, 5b can be arranged on both sides of the permanent magnet. In addition, it is also preferable that the cross-sectional areas of the pillar parts and the yoke parts 1a', 1b', 2a' and 2b' of the core are of different magnitudes preferably such that the cross-sectional area (X) of the pillar is smaller than that of the yoke (Y).

FIG. 6 presents the characteristic waveforms associated with the choke according to the invention as a function of the current $i_{DC}$. In the figure H is the strength of the magnetic field, $B_X$ the density of the magnetic flux in the pillar, $B_M$ is the density of the magnetic flux at the location of the permanent magnet and $B_{LIM}$ is the demagnetization limit of the permanent magnet. Owing to the permanent magnet, the curves start from negative values and grow to become positive along with the external current. $I_{DCN}$ describes the measuring point of the nominal current. Since the same magnetic flux travels through both the pillar and the magnet, the density of the magnetic flux in these parts is inversely proportional to their cross-sectional areas. The magnetic circuit according to the invention is dimensioned such that at the strength of the magnetic field at which the flux density of the core material in the pillar rises to the saturation limit, the flux density at the location of the permanent magnet is lower than the demagnetization limit of the material used. In this way the flux density of the permanent magnet can never grow too large, which prevents the permanent changing of the properties of the DC choke in special situations.

It is obvious to the person skilled in the art that the different embodiments of the invention are not limited solely to the example described above, but that they may be varied within the scope of the claims presented below. The permanent magnet can be disposed in a similar manner in an inclined attitude also elsewhere than in the corners, e.g. in an inclined attitude at the center of a pillar with respect to its longitudinal direction.

The invention claimed is:

1. DC choke arrangement of a power transformer, especially of a frequency converter, provided with a DC intermediate circuit and connected to an AC electricity network, for limiting the harmonics of the network current taken from the AC electricity network by an appliance, said DC choke arrangement comprising:
   at least one choke (Ldc+, Ldc−), arranged in a magnetic core, which contains pillar parts and yoke parts (1a', 1b', 2a', 2b'),
   at least one permanent magnet being arranged in the magnetic core of the choke,
   wherein the at least one permanent magnet is positioned at an angle with respect to the longitudinal direction of the part or parts of the magnetic core such that the cross-sectional area of the at least one permanent magnet is greater than the cross-sectional area of the part of the magnetic core;
   wherein in the magnetic circuit the cross-sectional areas of the at least one permanent magnet and of the magnetic core are fitted such that the density of the magnetic flux at the point of the at least one permanent magnet when the thinnest section of the magnetic core saturates is lower than the magnetic flux with which the permanent magnet demagnetizes.

2. Choke arrangement according to claim 1, wherein an air gap is arranged in one half or in both halves of the permanent magnet.

3. Choke arrangement according to claim 1, wherein the cross-sectional areas of the pillar parts and of the yoke parts of the magnetic core are of different magnitudes.

4. Choke arrangement according to claim 1, wherein there are two units of permanent magnets, disposed in opposite corners of the magnetic core.

5. Choke arrangement according to claim 1, wherein there are four units of permanent magnets, disposed in all the corners of the magnetic core.

6. Choke arrangement according to claim 1, wherein the permanent magnet is arranged at an angle of 30-60°, preferably 45°, with respect to the longitudinal axis of the yoke and/or of the pillar.

7. Choke arrangement according to claim 1, wherein the permanent magnet is disposed at an angle in the corner of the magnetic core such that the cross-sectional area of the permanent magnet is greater than the cross-sectional area of the other parts of the magnetic core.

8. Choke arrangement according to claim 2, wherein the cross-sectional areas of the pillar parts and of the yoke parts of the magnetic core are of different magnitudes.

9. Choke arrangement according to claim 2, wherein there are two units of permanent magnets, disposed in opposite corners of the magnetic core.

10. Choke arrangement according to claim 3, wherein there are two units of permanent magnets, disposed in opposite corners of the magnetic core.

11. Choke arrangement according to claim 2, wherein there are four units of permanent magnets, disposed in all the corners of the magnetic core.

12. Choke arrangement according to claim 3, wherein there are four units of permanent magnets, disposed in all the corners of the magnetic core.

13. Choke arrangement according to claim 2, wherein the permanent magnet is arranged at an angle of 30-60°, preferably 45°, with respect to the longitudinal axis of the yoke and/or of the pillar.

14. Choke arrangement according to claim 3, wherein the permanent magnet is arranged at an angle of 30-60°, preferably 45°, with respect to the longitudinal axis of the yoke and/or of the pillar.

15. Choke arrangement according to claim 4, wherein the permanent magnet is arranged at an angle of 30-60°, preferably 45°, with respect to the longitudinal axis of the yoke and/or of the pillar.

* * * * *